United States Patent [19]

Okazaki et al.

[11] Patent Number: 5,677,066
[45] Date of Patent: Oct. 14, 1997

[54] SEALING PART FOR CONNECTOR WATERPROOFING

[75] Inventors: Kiyotaka Okazaki; Masahiro Kanda, both of Shizuoka, Japan

[73] Assignee: Yazaki Corporation, Tokyo, Japan

[21] Appl. No.: 504,677

[22] Filed: Jul. 20, 1995

[30] Foreign Application Priority Data

Jul. 20, 1994 [JP] Japan ................... 6-167810

[51] Int. Cl.$^6$ ........................... C08K 3/04
[52] U.S. Cl. ............ 428/439; 428/440; 428/442; 525/100; 525/103; 525/104; 525/105; 525/106; 525/474
[58] Field of Search ................... 428/439, 440, 428/442; 525/100, 103, 104, 105, 106, 474

[56] References Cited

U.S. PATENT DOCUMENTS

| | | | |
|---|---|---|---|
| 4,335,035 | 6/1982 | Hatanaka et al. | 523/212 |
| 4,375,523 | 3/1983 | Hatanaka et al. | 523/212 |
| 4,444,944 | 4/1984 | Matsushita | 524/786 |
| 4,517,238 | 5/1985 | Mine et al. | 428/212 |
| 4,642,265 | 2/1987 | Suzuki | 428/375 |
| 4,714,734 | 12/1987 | Hashimoto et al. | 524/496 |
| 4,889,677 | 12/1989 | Hashimoto et al. | 264/297.5 |
| 5,010,137 | 4/1991 | Umeda et al. | 525/104 |

FOREIGN PATENT DOCUMENTS

| | | |
|---|---|---|
| 60-120755 | 6/1985 | Japan . |
| 61-21177 | 1/1986 | Japan . |
| 62-252457 | 11/1987 | Japan . |
| 63-309542 | 12/1988 | Japan . |

*Primary Examiner*—W. Robinson H. Clark
*Attorney, Agent, or Firm*—Sughrue, Mion, Zinn, Macpeak & Seas, PLLC

[57] ABSTRACT

A sealing part for connector waterproofing is disclosed, which comprises a vulcanized molding obtained from a composition comprising 100 parts by weight of a polyorganosiloxane (1), from 5 to 100 parts by weight of a reinforcing silica powder filler (2), from 0.01 to 10 parts by weight of a hydrogensiloxane polymer (3) having two or more Si-H bonds per molecule, and from 0.01 to 5 parts by weight of t-butyl peroxy-3,5,5-trimethylhexanoate (4). The sealing part for connector waterproofing of the present invention is satisfactory in heat resistance, low-temperature resistance, and oil resistance and can be produced at low cost in a reduced molding time.

11 Claims, 2 Drawing Sheets

SEALING PART FOR CONNECTOR WATERPROOFING

FIELD OF THE INVENTION

The present invention relates to a sealing part for connector waterproofing. More particularly, this invention relates to a sealing part for connector waterproofing which can be easily attached to a connector housing to attain reduced fitting resistance in the fitting of a pair of connector housings, can retain satisfactory waterproofing properties, and can be produced efficiently.

BACKGROUND OF THE INVENTION

Connectors for use in electrical connection in automotive electrical circuits are required to have not only oil resistance but a high degree of waterproofing sealing performance. Because of these requirements, the molding materials used for producing sealing rubber parts, e.g., packings and rubber plugs, for use in those connectors include an oil-bleeding NBR obtained by incorporating an aliphatic hydrocarbon oil into a butadiene-acrylonitrile copolymer (JP-A-61-21177), an oil-bleeding silicone rubber obtained by incorporating a silicone oil into a silicone rubber (JP-A-62-252457), and an oil-bleeding polyolefin rubber obtained by incorporating an ester plasticizer or the like into a polyolefin rubber (JP-A-63-309542). (The term "JP-A" as used herein means an "unexamined published Japanese patent application.")

However, these rubber materials each has a drawback as follows. The NBR material has insufficient heat resistance for use in high-temperature areas in automotive engine rooms, although this material is advantageous in cost and has excellent oil resistance. The silicone rubber material is expensive and hence unsuitable for general purpose, although excellent in heat resistance, low-temperature resistance, oil resistance, etc. The polyolefin material has insufficient oil resistance and is hence unsuitable for use in automotive engine rooms.

Under these circumstances, various investigations have been made on the reduction of part-molding times in order to reduce the per-piece cost of silicone rubber parts because the cost of the silicone rubber itself, having relatively excellent properties, cannot be reduced without a sacrifice of these properties. Millable silicone rubber compositions, for which an organic peroxide is generally used as a vulcanizing agent, are advantageous in that they have satisfactory storage stability and a long pot life and are easily handleable. However, such silicone rubber compositions have a problem that since vulcanization thereof requires much time, a reduction in molding time cannot be attained.

As a method for accelerating vulcanization, addition of a compound having an Si-H bond has been proposed (JP-A-60-120755). However, this method is not fully satisfactory in that the effect of reducing vulcanization times, which is desired in this invention, is low. Although a reduction in vulcanization time can be attained with an organic peroxide used for the hot-air vulcanization of silicone rubbers which has a low heat decomposition temperature, e.g., benzoyl peroxide or 2,4-dichlorobenzoyl peroxide, use of this kind of vulcanizing agents is unsuitable for practical use because scorching occurs during the vulcanization and molding of the rubber in molds with heating.

On the other hand, a two-pack type liquid silicone rubber composition which is vulcanized through an addition reaction with the aid of a platinum catalyst has been developed. This addition reaction type liquid silicone rubber composition can be vulcanized in a greatly reduced time period, so that a reduction in molding time can be attained. However, since this composition is of the two-pack type, it should be injected into molds and molded immediately after mixing. This composition hence has problems, for example, that new molding equipment is necessary and handling the composition is troublesome.

SUMMARY OF THE INVENTION

Accordingly, an object of the present invention is to provide a sealing part for connector waterproofing which is satisfactory in heat resistance, low-temperature resistance, and oil resistance and can be produced at low cost in a reduced molding time, and which therefore eliminates the problems of connector-waterproofing sealing parts produced from the conventional rubber materials described above.

The object of the present invention is accomplished with a sealing part for connector waterproofing which comprises a vulcanized molding obtained from a composition comprising 100 parts by weight of a polyorganosiloxane (1), from 5 to 100 parts by weight of a reinforcing silica powder filler (2), from 0.01 to 10 parts by weight of a hydrogensiloxane polymer (3) having two or more Si-H bonds per molecule, and from 0.01 to 5 parts by weight of t-butyl peroxy-3,5,5-trimethylhexanoate (4).

The effects of the invention can be more reliably produced with a sealing part for connector waterproofing which comprising an oil-bleeding vulcanizate obtained from a composition comprising components (1) to (4) described above and from 1 to 30 parts by weight of a bleeding-out oil (5) having poor compatibility in the composition.

DETAILED DESCRIPTION OF THE INVENTION

Figure 1:
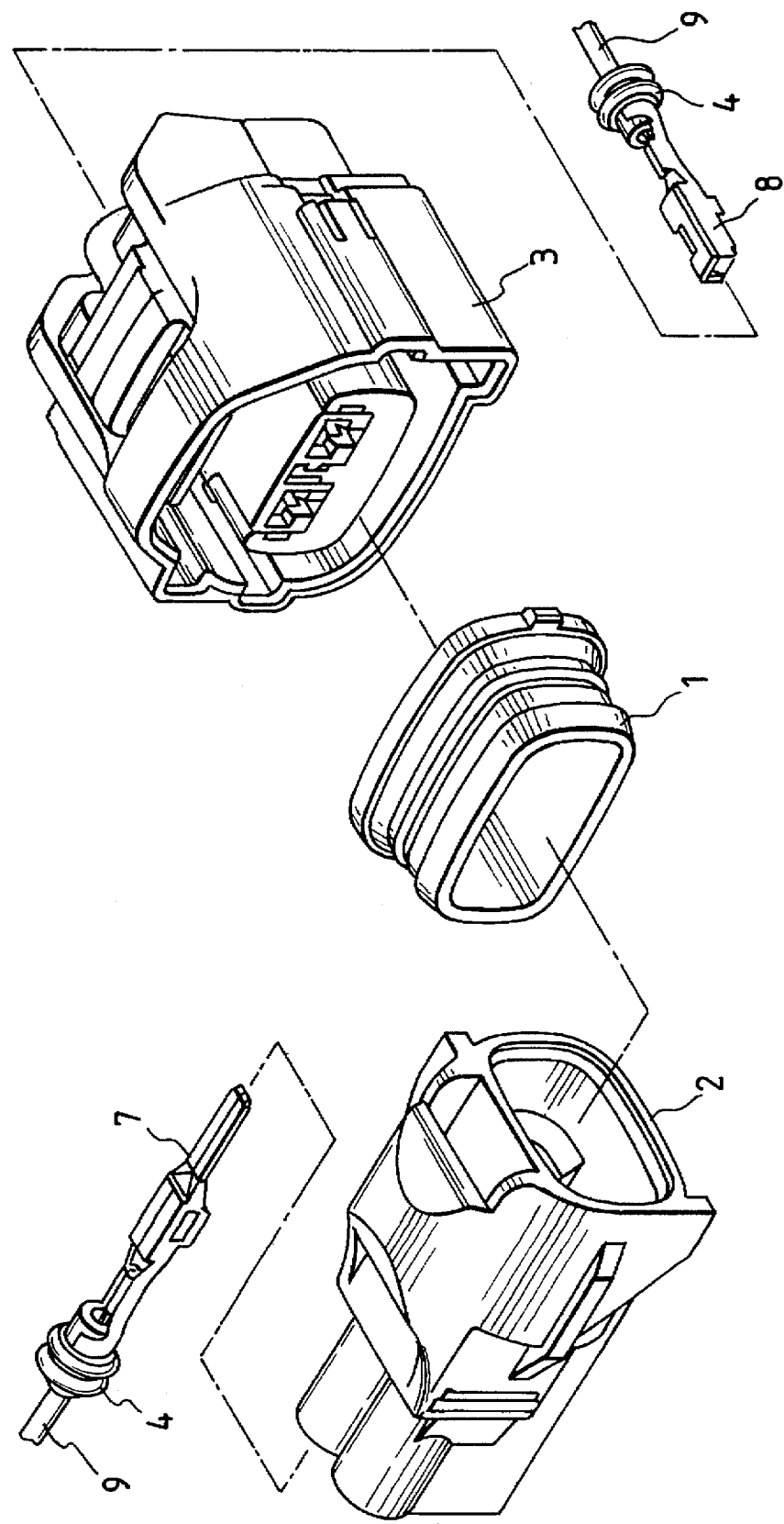
FIG. 1 is a view illustrating a method for using an embodiment of the sealing part for connector waterproofing according to the present invention.

The polyorganosiloxane contained as component (1) in the vulcanizable composition in the present invention is a compound represented by the average composition formula $R_aSiO_{(4-a)/2}$ (wherein R is a substituted or unsubstituted monovalent hydrocarbon group and a is a positive number of from 1.98 to 2.02).

The groups of R are substituted or unsubstituted monovalent hydrocarbon groups of the same or different kinds selected, for example, from alkyl groups, e.g., methyl, ethyl, propyl, and butyl, alkenyl groups, e.g., vinyl and allyl, aryl groups, e.g., phenyl, and substituted hydrocarbon groups formed by replacing part or all of the carbon-bonded hydrogen atoms with a halogen atom, a cyano group, etc. Examples of such substituted hydrocarbon groups include chloromethyl, 3,3,3-trifluoropropyl, and 2-cyanoethyl.

This polyorganosiloxane of component (1) is preferably one in which at least 98% of the groups of R are a $C_1$–$C_4$ alkyl group, especially methyl, and the remaining groups of R comprise vinyl, phenyl, or trifluoropropyl. The polyorganosiloxane preferably has a linear structure having an average degree of polymerization of from 3,000 to 10,000. If the degree of polymerization thereof is lower than 3,000, workability is impaired and sufficient mechanical strength is not obtained. If the degree of polymerization thereof exceeds 10,000, incorporation of the reinforcing silica powder of component (2) is difficult.

The reinforcing silica powder filler used as component (2) in this invention is incorporated for the purposes of vulcanizate reinforcement, improvement of processability, filling, etc. Examples of component (2) include anhydrous silica, precipitated silica, and calcined silica. These silicas each may be one whose surface has not been treated or has been treated beforehand with an organochlorosilane, a polyorganosiloxane, a hexaorganodisilazane, or the like. It is also possible to use an untreated silica powder and to treat the surface of the powder during kneading. Such silica powders may be used alone or in combination of two or more thereof. The incorporation amount of component (2) is from 5 to 100 parts by weight, preferably from 20 to 70 parts by weight, per 100 parts by weight of component (1). If the amount of component (2) is smaller than 5 parts, sufficient strength cannot be obtained. If the amount thereof exceeds 100 parts, not only incorporation thereof is difficult, but also the resulting vulcanizate does not have elasticity.

The polyhydrogensiloxane used as component (3) in this invention contains two or more Si-H bonds per molecule and has a viscosity at 25° C. of from 10 to 100,000 cSt. The incorporation amount of component (3) is from 0.01 to 10 parts by weight, preferably from 0.1 to 5 parts by weight, per 100 parts by weight of component (1). If the amount thereof is smaller than 0.01 part by weight, a reduction in molding time cannot be attained. If the amount thereof exceeds 10 parts by weight, the compound undergoes pseudo-crosslinking to have impaired workability. The molecular shape of the polyhydrogensiloxane may be linear, branched, or cyclic, or may be a mixture of these.

Component (4) used in this invention is t-butyl peroxy-3,5,5-triethylhexanoate. Only when a combination of this component (4) and the polyorganohydrogensiloxane of component (3) is used, not only the conventional vulcanization time can be reduced to about half but also scorching during molding with vulcanization can be prevented. This combination is therefore exceedingly advantageous for practical use. This is in contrast to the peroxides generally used for silicone vulcanization, e.g., alkyl, acyl, and perester peroxides, which cause a decrease in production efficiency due to scorching and attain an insufficient reduction in vulcanization time even when used in combination with a polyorganohydrogensiloxane. Both of a sufficient reduction in vulcanization time and the prevention of scorching can be attained only when t-butyl peroxy-3,5,5-triethylhexanoate of component (4) and the polyorganohydrogensiloxane of component (3) are used in combination.

The incorporation amount of this component (4) can be suitably selected according to need in the range of from 0.01 to 5 parts by weight per 100 parts by weight of component (1). If the amount of component (4) is smaller than 0.01 part by weight, vulcanization is difficult. If the amount thereof exceeds 5 parts by weight, the resulting vulcanizate has impaired properties.

Component (5) which may be used in this invention is an oil which bleeds out to the surface of the vulcanizate. Examples of this oil include silicone oils poorly compatible with the polyorganosiloxane of component (1) as the main polymer, and further include the phthalic esters given in JP-A-6-329832. Examples of such silicone oils include poly(diphenylsiloxy)(dimethylsiloxy) copolymers and poly(methylphenylsiloxy)(dimethylsiloxy) copolymers.

The viscosity at 25° C. of this component (5) is desirably from 20 to 10,000 cSt, preferably from 50 to 1,000 cSt. Oils having a viscosity below 20 cSt partly volatilize during molding with vulcanization or during secondary vulcanization, resulting in a reduced bleeding-oil amount in the system and hence impaired oil-bleeding properties. On the other hand, use of an oil having a viscosity above 10,000 cSt results in impaired oil-bleeding properties because the molecules of such an oil have a reduced degree of freedom.

The incorporation amount of component (5) is preferably from 1 to 30 parts by weight per 100 parts by weight of component (1). If the amount thereof is below 1 part by weight, there are cases where the desired oil bleeding is not obtained. If the amount thereof exceeds 30 parts by weight, not only the resulting rubber has reduced mechanical strength or tends not to retain the desired hardness, but also there are cases where the unvulcanized rubber composition suffers oil bleeding to the surface thereof to cause troubles in molding with vulcanization, such as welding defects in moldings and severer mold fouling.

The sealing part for connector waterproofing according to the present invention is obtained by mixing and kneading the components described above, injecting the resulting composition into a mold, and heating the composition in the mold to conduct molding and vulcanization. For kneading, a known kneading machine for rubber compositions can be utilized, such as, e.g., a roll mill, a kneader, or a Banbury mixer. For molding and vulcanization, a known machine for molding and vulcanizing rubbers can be utilized, such as, e.g., an injection molding machine or a transfer molding machine.

The sealing part for connector waterproofing according to the present invention is highly advantageous in cost because the vulcanization time required in molding is exceedingly short due to the use of a polyorganohydrogensiloxane and t-butyl peroxy-3,5,5-triethylhexanoate in combination. In the case where the molding composition contains a bleeding-out oil poorly compatible with the base rubber, this oil begins to gradually bleed out after molding and vulcanization to thereby function to enhance the sealing properties of connector housings.

EXAMPLE

From the materials shown in Table 1, rubber compositions a to t were obtained according to the respective formulations shown in Table 2 using a kneader mixer and a two-roll mill for kneading. The compositions were evaluated for workability in kneading; compositions having satisfactory suitability for rolling are indicated by A, and ones having poor suitability for rolling are indicated by C.

Table 1

Material 1: A homogeneous compound obtained by kneading, with a kneader, 100 parts by weight of a raw polyorganosiloxane rubber terminated by a dimethylvinylsilyl group and having a dimethylsilyl unit content of 99.92 mol %, a methylvinylsilyl unit content of 0.08 mol %, and an average degree of polymerization of 6,000 with 40 parts by weight of Nipsil LP (reinforcing wet-process silica powder manufactured by Nippon Silica Industrial Co., Ltd., Japan).

Material 2: TSF433 (manufactured by Toshiba Silicone Co., Ltd., Japan; dimethylsilyl unit content, 67 mol %; phenylmethylsilyl unit content, 33 mol %; viscosity at 25° C., 400 cSt).

Material 3A: A polyorganohydrogensiloxane which is a linear polymer terminated at both ends by a trimethylsilyl group and having a methylhydrosilyl unit content of 99 mol % and a viscosity at 25° C. of 20 cSt.

Material 3B: A polyorganohydrogensiloxane which is a linear polymer terminated at both ends by a trimethylsilyl group and having a methylhydrosilyl unit content of 50 mol %, a dimethylsilyl unit content of 50 mol %, and a viscosity at 25° C. of 20 cSt.

Material 3C: A cycloorganohydrogensiloxane having an effective hydrogen amount of 1% and a viscosity at 25° C. of 20 cSt.

Material 4: t-Butyl peroxy-3,5,5-trimethylhexanoate.

Material 5: 2,5-Dimethyl-2,5-di(t-butylperoxy)hexane.

Material 6: 2,4-Dichlorobenzoyl peroxide.

Material 7: t-Butyl peroxybenzoate.

These rubber compositions were stored at 30° C. for each of 5 days and 30 days, and then examined for vulcanization initiation time at 170° C. ($T_{10}$: the time required for torque to increase to 10% of its final value) using an oscillating disk rheometer manufactured by Toyo Seiki Seisaku-Sho, Ltd., Japan. After storage stability was thus examined, rubber packings 1 having the shape shown in FIG. 1 were molded by transfer molding at a mold temperature of 170° C. to determine the vulcanization time required for obtaining satisfactory product properties. Along with this test for examining the effect of reducing vulcanization times, the compositions were also examined for moldability and percent molding defective. Moldability was evaluated with respect to short molding, changes of molding conditions, etc.; compositions satisfactory in moldability are indicated by A, and ones which caused a trouble are indicated by C. The evaluation of percent molding defective was made based on an appearance inspection, etc., and the proportion (%) of defectives is shown.

Each of the rubber packings 1 obtained and a rubber plug 4 molded beforehand from a different material and having the shape shown in FIG. 1 were attached to the female housing 2 of a waterproofing resin connector shown in the figure. This female housing 2 was fitted into the male housing 3, and the force (kgf) required for fitting was measured with a device for measuring compressive stress (Autograph, manufactured by Shimadzu Corp., Japan); this force is taken as the fitting force.

Figure 2:
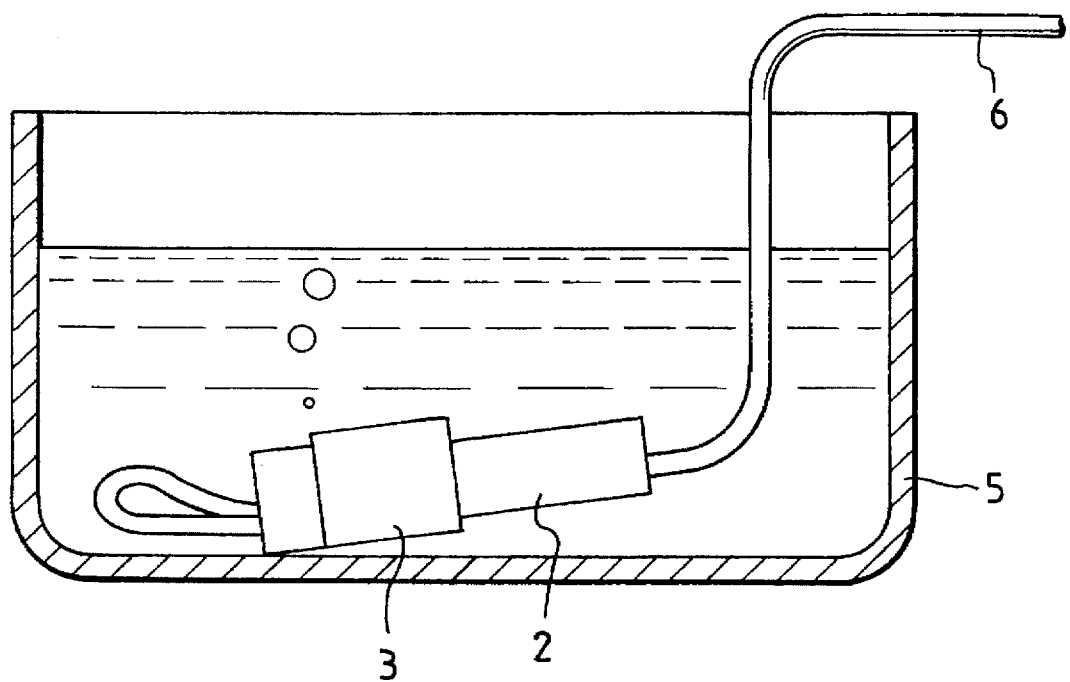
FIG. 2 is a view illustrating a method for testing the sealing performance of a sealing part for connector waterproofing according to the present invention.

Subsequently, an air tube 6 was attached to part of the rubber plug-attached areas of the fitted waterproofing connector housings. The connector housings were immersed in a water tank 5 shown in FIG. 2 at a depth of about 10 cm from the surface of the water. Air was then fed into the connector housings through the air tube 6 until the air pressure in the housings reached 9.8 kPa, and the immersed connector housings were maintained for 30 seconds to examine as to whether air leakage occurred or not. In the case where no air leakage occurred, the air pressure was increased further by 9.8 kPa and the immersed connector housings were maintained for 30 seconds to examine air leakage. This operation was repeated until the air pressure reached 59 kPa. Thus, initial waterproofing properties were evaluated. Connector housings which underwent no air leakage are indicated by A, and ones which underwent air leakage are indicated by C.

On the other hand, the fitted waterproofing connector housings were aged at 120° C. for 1,000 hours, and the waterproofing properties thereof after aging were evaluated in the same manner as the above.

The results of these evaluations are summarized in Table 2.

In Table 2,

*: Comparative example, (i): $T_{10}$, (ii): Moldability, (iii): Percent molding defective, (iv): Vulcanization time, (v): Fitting force, (vi): Initial waterproofing property, and (vii): Waterproofing property after aging.

TABLE 2

Properties of Rubber Compositions and Packings

| | Test No. | | | | | | | | | |
|---|---|---|---|---|---|---|---|---|---|---|
| | a | b | c | d | e* | f* | g* | h* | i* | j* |
| | | | | | (unit: parts by weight) | | | | | |
| Material 1 | 100 | 100 | 100 | 100 | 100 | 100 | 100 | 100 | 100 | 100 |
| Material 2 | — | — | — | 6.0 | — | — | — | — | — | — |
| Material 3A | 0.5 | — | — | 0.5 | 0.05 | — | — | 12 | — | — |
| Material 3B | — | 0.5 | — | — | — | 0.05 | — | — | 12 | — |
| Material 3C | — | — | 0.5 | — | — | — | 0.05 | — | — | 12 |
| Material 4 | 0.6 | 0.6 | 0.6 | 0.6 | 0.6 | 0.6 | 0.6 | 0.6 | 0.6 | 0.6 |
| Material 5 | — | — | — | — | — | — | — | — | — | — |
| Material 6 | — | — | — | — | — | — | — | — | — | — |
| Material 7 | — | — | — | — | — | — | — | — | — | — |
| Results of Property Evaluation | | | | | | | | | | |
| Suitability for rolling | A | A | A | A | A | A | A | C | C | C |
| After 5-day storage | | | | | | | | | | |
| (i) | 31 | 35 | 35 | 30 | 40 | 41 | 41 | 30 | 33 | 33 |
| (ii) | A | A | A | A | A | A | A | A | A | A |
| (iii) | 0.80 | 0.79 | 0.82 | 0.70 | 0.88 | 0.79 | 0.95 | 1.00 | 0.50 | 0.75 |
| (iv) | 2 | 2 | 2 | 2 | 3 | 3 | 3 | 2 | 2 | 2 |
| (v) | 2.00 | 1.96 | 2.20 | 2.14 | 2.13 | 2.04 | 2.22 | 2.12 | 2.16 | 2.18 |
| (vi) | A | A | A | A | A | A | A | A | A | A |
| (vii) | A | A | A | A | A | A | A | A | A | A |
| After 30-day storage | | | | | | | | | | |

TABLE 2-continued

Properties of Rubber Compositions and Packings

| | | | | | | | | | | |
|---|---|---|---|---|---|---|---|---|---|---|
| (i) | 33 | 34 | 35 | 32 | 39 | 42 | 42 | 32 | 34 | 36 |
| (ii) | A | A | A | A | A | A | A | A | A | A |
| (iii) | 0.73 | 0.89 | 0.75 | 0.66 | 0.90 | 0.86 | 0.87 | 0.88 | 0.68 | 0.63 |
| (iv) | 2 | 2 | 2 | 2 | 3 | 3 | 3 | 2 | 2 | 2 |
| (v) | 1.94 | 1.96 | 2.07 | 1.81 | 2.14 | 2.11 | 2.26 | 2.15 | 2.20 | 2.18 |
| (vi) | A | A | A | A | A | A | A | A | A | A |
| (vii) | A | A | A | A | A | A | A | A | A | A |

| | Test No. | | | | | | | | | |
|---|---|---|---|---|---|---|---|---|---|---|
| | k* | l* | m* | n* | o* | p* | q* | r* | s* | t* |
| | (unit: parts by weight) | | | | | | | | | |
| Material 1 | 100 | 100 | 100 | 100 | 100 | 100 | 100 | 100 | 100 | 100 |
| Material 2 | — | — | — | — | — | — | — | — | — | 40 |
| Material 3A | 0.5 | 0.5 | — | — | — | — | 0.5 | 0.5 | 0.5 | 0.5 |
| Material 3B | — | — | — | — | — | — | — | — | — | — |
| Material 3C | — | — | — | — | — | — | — | — | — | — |
| Material 4 | 0.005 | 7.5 | 0.6 | — | — | — | — | — | — | 0.6 |
| Material 5 | — | — | — | 0.6 | — | — | 0.6 | — | — | — |
| Material 6 | — | — | — | — | 0.6 | — | — | 0.6 | — | — |
| Material 7 | — | — | — | — | — | 0.6 | — | — | 0.6 | — |
| Results of Property Evaluation | | | | | | | | | | |
| Suitability for rolling | A | A | A | A | A | A | A | A | A | A |
| After 5-day storage | | | | | | | | | | |
| (i) | 150 | 28 | 42 | 91 | 7 | 55 | 76 | 4 | 44 | 32 |
| (ii) | A | A | A | A | C | A | A | C | A | C |
| (iii) | 1.00 | 0.67 | 1.00 | 0.89 | 39.77 | 0.77 | 0.66 | 37.55 | 0.97 | 3.00 |
| (iv) | 10 | 2 | 3 | 7 | 2 | 4 | 5 | 2 | 3 | 2 |
| (v) | 2.36 | 2.01 | 2.12 | 2.18 | 2.00 | 2.16 | 2.18 | 1.96 | 2.10 | 1.76 |
| (vi) | A | A | A | A | C | A | A | C | A | A |
| (vii) | A | C | A | A | C | A | A | C | A | A |
| After 30-day storage | | | | | | | | | | |
| (i) | 155 | 30 | 44 | 96 | 9 | 57 | 74 | 5 | 46 | 33 |
| (ii) | A | A | A | A | C | A | A | C | A | C |
| (iii) | 0.75 | 0.67 | 0.88 | 0.75 | 37.50 | 0.85 | 0.77 | 32.80 | 0.96 | 3.25 |
| (iv) | 10 | 2 | 3 | 7 | 2 | 4 | 5 | 2 | 3 | 2 |
| (v) | 2.21 | 2.00 | 2.18 | 2.16 | 1.84 | 2.09 | 2.05 | 1.89 | 2.15 | 1.69 |
| (vi) | A | A | A | A | C | A | A | C | A | A |
| (vii) | A | C | A | A | C | A | A | C | A | A |

The sealing part for connector waterproofing according to the present invention has excellent storage stability, requires a reduced vulcanization time to attain a reduction in production cost, and is less apt to have molding defects, e.g., minute welding defects. Therefore, the sealing part has the effects of being excellent in waterproofing property, surface lubricity, and water repellency.

While the invention has been described in detail and with reference to specific embodiments thereof, it will be apparent to one skilled in the art that various changes and modifications can be made therein without departing from the spirit and scope thereof.

What is claimed is:

1. A sealing part for connector waterproofing which comprises a vulcanized molding obtained from a composition comprising 100 parts by weight of a polyorganosiloxane (1), from 5 to 100 parts by weight of a reinforcing silica powder filler (2), from 0.01 to 10 parts by weight of a hydrogensiloxane polymer (3) having two or more Si-H bonds per molecule, and from 0.01 to 5 parts by weight of t-butyl peroxy-3,5,5-trimethylhexanoate (4).

2. The sealing part for connector waterproofing as claimed in claim 1, wherein said polyorganosiloxane (1) is a compound represented by the average composition formula $R_aSiO_{(4-a)/2}$ wherein R is a substituted or unsubstituted monovalent hydrocarbon group and a is a positive number of from 1.98 to 2.02.

3. The sealing part for connector waterproofing as claimed in claim 2, wherein the substituted or unsubstituted monovalent hydrocarbon group represented by R is selected from the group consisting of alkyl groups, alkenyl groups, aryl groups, and substituted hydrocarbon groups formed by replacing part or all of the carbon-bonded hydrogen atoms with a halogen atom or a cyano group.

4. The sealing part for connector waterproofing as claimed in claim 1, wherein said polyorganosiloxane (1) has a linear structure having an average degree of polymerization of from 3,000 to 10,000.

5. The sealing part for connector waterproofing as claimed in claim 1, wherein the content of said reinforcing silica powder filler (2) is from 20 to 70 parts by weight, per 100 parts by weight of the polyorganosiloxane (1).

6. The sealing part for connector waterproofing as claimed in claim 1, wherein said hydrogensiloxane polymer (3) has a viscosity at 25° C. of from 10 to 100,000 cSt.

7. The sealing part for connector waterproofing as claimed in claim 1, wherein the content of said hydrogensiloxane polymer (3) is from 0.1 to 5 parts by weight, per 100 parts by weight of the polyorganosiloxane (1).

8. The sealing part for connector waterproofing as claimed in claim 1, wherein said bleeding-out oil (5) is poly(diphenylsiloxy)(dimethylsiloxy) copolymer or poly(methylphenylsiloxy)(dimethylsiloxy) copolymer.

9. The sealing part for connector waterproofing as claimed in claim 1, wherein the composition further comprises from 1 to 30 parts by weight of a bleeding-out oil (5) having poor compatibility in the composition.

10. The sealing part for connector waterproofing as claimed in claim 9, wherein said bleeding-out oil (5) has a viscosity of from 20 to 10,000 cSt.

11. The sealing part for connector waterproofing as claimed in claim 10, wherein said bleeding-out oil (5) has a viscosity of from 50 to 1,000 cSt.

* * * * *